United States Patent
Von Der Weid et al.

(10) Patent No.: US 10,250,323 B2
(45) Date of Patent: Apr. 2, 2019

(54) DEVICE AND METHOD FOR MONITORING OPTICAL FIBRE LINK

(71) Applicant: TELEFONAKTIEBOLAGET LM ERICSSON (PUBL), Stockholm (SE)

(72) Inventors: Jean Pierre Von Der Weid, Rio de Janeiro (BR); Gustavo Castro Do Amaral, Rio de Janeiro (BR); Diego Rodrigo Villafani Caballero, Rio de Janeiro (BR)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/576,886

(22) PCT Filed: Aug. 26, 2015

(86) PCT No.: PCT/SE2015/050898
§ 371 (c)(1),
(2) Date: Nov. 27, 2017

(87) PCT Pub. No.: WO2016/190792
PCT Pub. Date: Dec. 1, 2016

(65) Prior Publication Data
US 2018/0152239 A1 May 31, 2018

Related U.S. Application Data

(60) Provisional application No. 62/167,693, filed on May 28, 2015.

(51) Int. Cl.
*H04B 10/077* (2013.01)
*H04B 10/071* (2013.01)

(52) U.S. Cl.
CPC ....... *H04B 10/071* (2013.01); *H04B 10/0771* (2013.01); *H04B 10/0775* (2013.01)

(58) Field of Classification Search
None
See application file for complete search history.

(56) References Cited

U.S. PATENT DOCUMENTS

| 4,551,019 A * | 11/1985 | Vella | G01M 11/333 356/73.1 |
| 5,090,665 A * | 2/1992 | Walters | G01L 5/047 254/134.4 |
| 5,844,235 A * | 12/1998 | Tachikawa | G01M 11/3172 250/227.14 |
| 6,819,849 B1 * | 11/2004 | Tangonan | G02B 6/0288 385/12 |

(Continued)

FOREIGN PATENT DOCUMENTS

EP 1884758 A1 * 2/2008 ........... H04B 10/071

*Primary Examiner* — Li Liu

(57) ABSTRACT

A method for monitoring an optical fiber link comprises generating a monitoring signal used for monitoring the optical fiber link, combining the generated monitoring signal with a data signal to be transmitted over the optical fiber link, detecting backscattering of the monitoring signal from the optical fiber link, detecting a change in characteristic of the detected backscattered monitoring signal, and determining, from the detected change in characteristic, at least one location along the optical fiber link where the monitoring signal is modified, and signal loss at this location.

18 Claims, 9 Drawing Sheets

(56) References Cited

U.S. PATENT DOCUMENTS

| | | | |
|---|---|---|---|
| 8,259,387 B2* | 9/2012 | Campanelli | G01M 11/3154 356/73.1 |
| 8,514,381 B2* | 8/2013 | Shao | H04B 10/071 356/73.1 |
| 8,755,688 B2* | 6/2014 | Vleugels | H04B 10/25753 398/100 |
| 9,344,188 B2* | 5/2016 | Vall-Llosera | G01M 11/3127 |
| 9,829,410 B2* | 11/2017 | Chen | G01M 11/3172 |
| 2004/0027560 A1* | 2/2004 | Fredin | G01K 11/32 356/73.1 |
| 2004/0208523 A1* | 10/2004 | Carrick | H04B 10/071 398/32 |
| 2005/0196174 A1* | 9/2005 | Evangelides, Jr. | H04B 10/0771 398/151 |
| 2009/0103072 A1* | 4/2009 | Fromme | G01K 11/32 356/3 |
| 2010/0092176 A1* | 4/2010 | Hartog | H04B 10/61 398/79 |
| 2011/0217036 A1* | 9/2011 | Campanelli | H04B 10/071 398/13 |
| 2012/0237205 A1* | 9/2012 | Duncan | E21B 47/0006 398/25 |
| 2013/0021615 A1* | 1/2013 | Duncan | G01H 9/004 356/477 |
| 2013/0093598 A1* | 4/2013 | Duncan | G01L 1/242 340/854.7 |
| 2014/0140691 A1* | 5/2014 | Reaves | G01M 11/3172 398/21 |
| 2014/0362367 A1* | 12/2014 | Chen | G01M 11/3127 356/73.1 |
| 2015/0023658 A1* | 1/2015 | Vilela De Faria | H04B 10/071 398/21 |
| 2015/0346053 A1* | 12/2015 | Lally | G01D 5/35358 356/477 |
| 2016/0123837 A1* | 5/2016 | Chen | G01M 11/088 356/73.1 |
| 2017/0016801 A1* | 1/2017 | Nikles | G01M 5/0033 |
| 2017/0276523 A1* | 9/2017 | Lally | G01D 5/353 |
| 2017/0363410 A1* | 12/2017 | Froggatt | G01B 11/18 |

* cited by examiner

DEVICE AND METHOD FOR MONITORING OPTICAL FIBRE LINK

This application is a 371 of International Application No. PCT/SE2015/050898, filed Aug. 26, 2015, which claims the benefit of U.S. Application No. 62/167,693 filed May 28, 2015, the disclosures of which are fully incorporated herein by reference.

TECHNICAL FIELD

The invention relates to a device and a method performed by the device of monitoring an optical fibre link. The invention further relates to a computer program for causing the device to perform the method according to the invention, and a corresponding computer program product.

BACKGROUND

A growing demand for video/data transmitted the Internet and other networks increases need for higher speeds in transmission and delivery systems, especially at what is known as "the last mile", i.e. the last part of the transmission line reaching a user. Nowadays, telecommunications operators are deploying a large number of fibre links in order to deliver broadband access to the user based on Passive Optical Networks (PONs). With the increasing number of fibres and cables, the probability of fault at some point of the PON also increases, generating a demand for fibre inspection.

The need for optical fibre maintenance functions for prevention and fault maintenance has been extensively discussed, for instance by International Telecommunication Union's Telecommunication Standardization Sector Study Group 6 (ITU-T SG6). Most studies considered by the group were based on the use of traditional Optical Time Domain Reflectometry (OTDR) in order to localize faults with reasonable accuracy without in optical networks without interfering with data transmission.

It is desirable to implement an inspection solution that neither interferes with data transmission, nor requires high additional capital and operational expenses. Furthermore, the implementation of Subcarrier Multiplexed (SCM) signals in PONs enables the use of a subcarrier for fibre monitoring purposes, rather than monitoring faults over a separate optical carrier, which would require a separate transmission and detection scheme.

Some solutions proposed for fault location are based on the coherent Optical Frequency Domain Reflectometry (OFDR) technique (see Oberson et al., "Optical Frequency Domain Reflectometry with a Narrow Linewidth Fiber Laser," IEEE Photonics Technology Letters, Vol. 12, No. 7, July 2000, 867-869), which provides accuracy for few hundred meters to a few kilometers fiber monitoring. Nonetheless, this approach is associated with the employment of high coherency lasers making it prohibitive in association with SCM PON monitoring. Other solutions based on the incoherent OFDR have been proposed (see Ryu, Dagenais, "Incoherent Optical Frequency Domain Reflectometry for Health Monitoring of Avionics Fiber Optics Networks," Avionics, Fiber-Optics and Photonics Technology Conference, IEEE, Sep. 30, 2008-Oct. 2, 2008 15-16; Shao et al., U.S. Pat. No. 8,514,381) but both use broadband frequency sweep of the modulation frequency, which is incompatible with subcarrier data transmission and can only detect localized reflections at devices in the network.

Another proposed solution is based on the measurement of the frequency response of the reflected signal from the fiber by suppressing the Rayleigh scattering and detecting reflections along the fiber (see Nakayama, et al., "Optical Fiber Fault Locator by the Step Frequency Method," Applied Optics, Vol. 26, No. 3, Feb. 1, 1987, 440-443). However this solution is unable to detect non-reflective losses, which are a common fault in optical networks.

SUMMARY

An object of the present invention is to solve, or at least mitigate, this problem in the art and to provide an improved method and device for monitoring an optical fibre link.

This object is attained in a first aspect of the present invention by a method of monitoring an optical fibre link, comprising generating a monitoring signal used for monitoring the optical fibre link, which monitoring signal is swept over at least one set of selected frequencies, combining the generated monitoring signal with a data signal to be transmitted over the optical fibre link, detecting backscattering of the monitoring signal from the optical fibre link, detecting a change in characteristic of the detected backscattered monitoring signal and determining, from the detected change in characteristic, at least one location along the optical fibre link where the monitoring signal is modified, as well as signal loss at this location.

This object is attained in a second aspect of the present invention by a monitoring device configured to monitor an optical fibre link. The monitoring device comprises a signal generator configured to generate a monitoring signal, which is swept over at least one set of selected frequencies, to be combined with a data signal to be transmitted by an optical transmitter over the optical fibre link, an optical receiver configured to detect backscattering of the monitoring signal from the optical fibre link, and a processing unit configured to detect a change in characteristic of the detected backscattered monitoring signal and to determine, from the change in characteristic, at least one location along the optical fibre link where the monitoring signal is modified, and signal loss caused by the modification.

Thus, at an optical transmitter, a monitoring signal is generated and combined with "regular" data signal to be transmitted over the optical fibre link to be monitored. The monitoring signal modulates a light source for transmitting an optical signal over the optical fibre link via an optical circulator. The combined signal enters a first port of the circulator and exits into the optical fibre link via a second port. In case of a fault or a break in the optical fibre link, the combined signal will be attenuated and/or partially reflected (i.e. modified) after the fault or break point towards the user. The fraction of the monitoring signal, which is backscattered along the link will also be attenuated or modified after the fault or break point. The backscattered signal will thus be received at the second port of the circulator and output at a third port of the circulator. The backscattered monitoring signal is thus detected at the third port of the circulator and a change in characteristic of backscattered monitoring signal is determined, in an embodiment by mathematical processing such as Inverse Fast Fourier Transform (IFFT), to reveal the monitoring signal intensity along the fibre link, including fibre attenuation, localized losses and reflections.

Random fluctuations of the processed signal reduce the signal to noise ratio (SNR) and dynamic range (DR) of the result. These fluctuations are dependent on the optical frequency as well on the set of modulation frequencies used to measure the signal. By repeating the measurement procedure using different optical wavelengths or different sets of modulation frequencies and averaging the results will then increase the SNR and Dynamic Range of the measurement.

Thus, in an embodiment, the detecting of change in characteristic of the detected backscattered monitoring signal, and subsequently determining a location of modification along the fibre, advantageously comprises generating the monitoring signal by performing a sweep over a plurality of sets of selected frequencies, calculating the IFFTs of the detected backscattered monitoring signal for each set of frequencies, and averaging results of the IFFTs calculated for each set of frequencies.

In a further embodiment of the invention, the monitoring device comprises a vector voltmeter for performing detection of the backscattered signal with a sinusoidal frequency-swept monitoring signal as a reference, wherein amplitude and phase of the backscattered monitoring signal advantageously is detected.

In still a further embodiment the detected change in characteristic of the detected backscattered monitoring signal is compared with an estimated change in characteristic of the detected backscattered monitoring signal. If the estimation is sufficiently accurate the at least one location and signal loss can advantageously be determined from a best fit of the detected change to the estimated change. Hence, in case the change in characteristic of the monitoring signal is detected by performing an IFFT, the performed IFFT can be compared and fitted to an estimated IFFT, since an expected transfer function of the optical fibre link generally is known by the fibre link operator.

In yet further embodiments, the fitting is undertaken by employing Least Mean Square (LMS) or a Digital Trend Filter.

With the disclosed monitoring device, a fibre monitoring-scheme for fault location and loss measurement is advantageously provided in optical fibre links (as used in e.g. PONs and hybrid copper-fibre PONs) employing the same equipment used for data transmission.

Thus, a method is presented to locate and measure faults in an optical fibre based on the modulation of the optical power launched in the fibre and measuring the phase and amplitude of the modulated backscattered optical power by adding a monitoring device to the equipment used for data transmission, advantageously granting low additional cost. The method uses a subcarrier of an SCM-PON and can be equally used in a PON utilizing Time-Division Multiplexing (TDM) or Wavelength-Division Multiplexing (WDM).

The modification of the monitoring signal along the optical fibre link typically includes attenuation or partial reflection of the monitoring signal. Thus, the location of the modification, as well as reflection intensity or signal loss resulting from the modification, are advantageously determined.

The monitoring signal is typically, but not necessarily, generated in one particular subcarrier to avoid any interference with the data signal on other subcarriers. Any subcarrier or combination of subcarriers can be used to monitor the optical link.

Advantageously, the detection of fault location and intensity in an optical fiber link can be done efficiently without the need for additional transmission equipment; only the monitoring device according to embodiments of the present invention is interfaced with an existing optical transmitter. Further advantageous is that a simple and straightforward modulation scheme can be used for the monitoring signal.

The invention further relates to a computer program for causing the monitoring device to perform the method according to the invention, and a corresponding computer program product.

Preferred embodiments of the present invention will be set forth in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
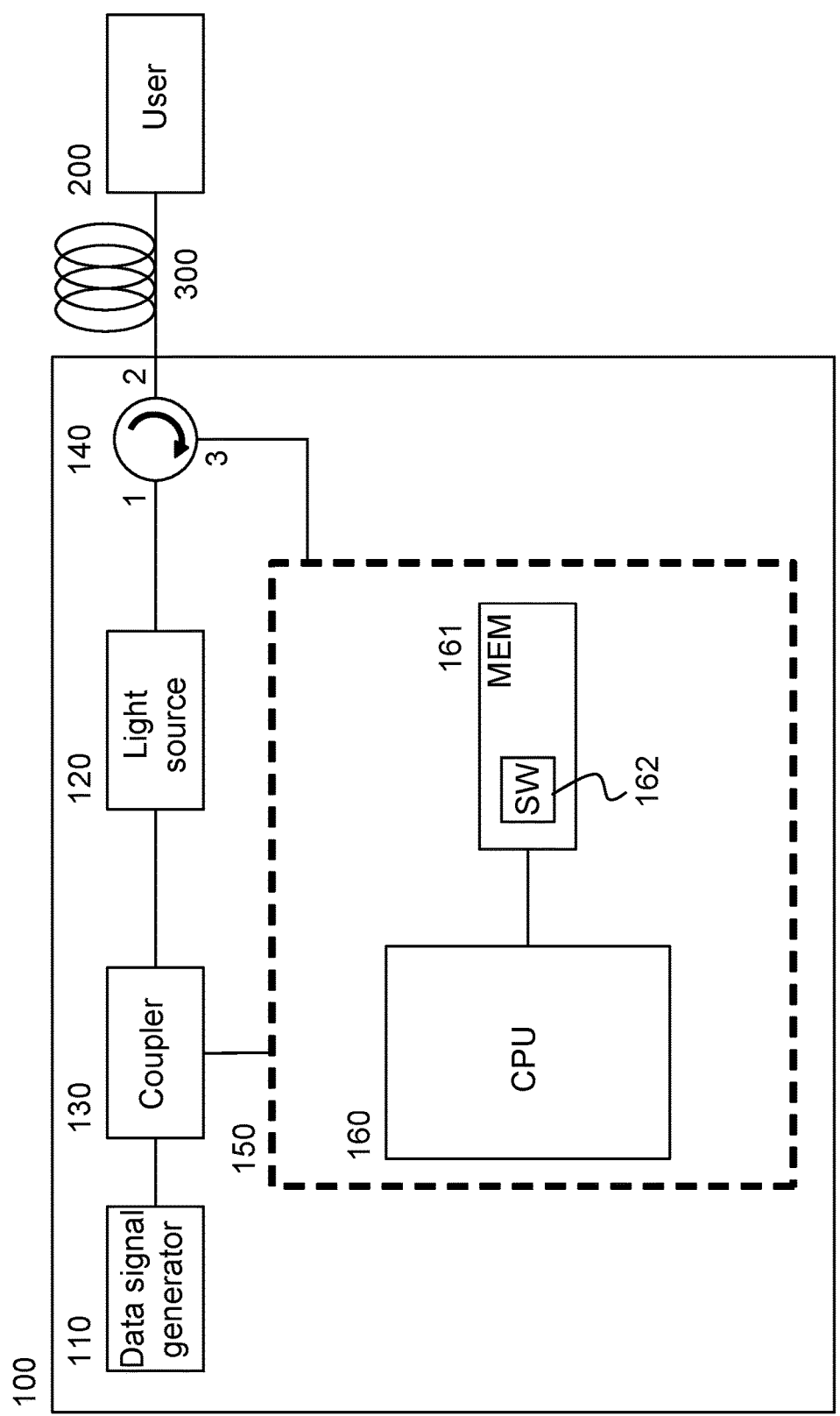
FIG. 1 illustrates an optical transmitter in which a monitoring device according to an embodiment of the present invention is implemented.

FIG. 1 illustrates an optical transmitter 100 in which a monitoring device 150 according to an embodiment of the present invention is implemented for advantageously detecting fault loss intensity and location during ongoing communication. The optical transmitter 100 transmits an optical data signal to a user 200 via an optical fibre link 300.

The optical transmitter 100 comprises a data signal generator 110 used for generating regular communication data signals or to combine external data signals into generated subcarriers (for one or multiple users). The generator is connected to a light source 120 for generating optical data signals transmitted to the user 200 via the optical fibre link 300. Further, in order to connect the monitoring device 150 to the communication path of the optical transmitter 100, a coupler 130 is utilized as well as a circulator 140.

In practice, parts or all of the steps of the method at the monitoring device 150 of monitoring the optical fiber link 300 is performed by a processing unit 160 embodied in the form of one or more microprocessors arranged to execute a computer program 162 downloaded to a suitable storage medium 161 associated with the microprocessor, such as a Random Access Memory (RAM), a Flash memory or a hard disk drive. The processing unit 160 is arranged to carry out the method according to embodiments of the present invention when the appropriate computer program 162 comprising computer-executable instructions is downloaded to the storage medium 161 and executed by the processing unit 160, possibly by interfacing with other elements of the monitoring device 150, such as a photodetector for enabling optical reception. The storage medium 161 may also be a computer program product comprising the computer program 162. Alternatively, the computer program 162 may be transferred to the storage medium 161 by means of a suitable computer program product, such as a Digital Versatile Disc (DVD) or a memory stick. As a further alternative, the computer program 162 may be downloaded to the storage medium 161 over a network. The processing unit 160 may alternatively be embodied in the form of a digital signal processor (DSP), an application specific integrated circuit (ASIC), a field-programmable gate array (FPGA), a complex programmable logic device (CPLD), etc.

Figure 2:
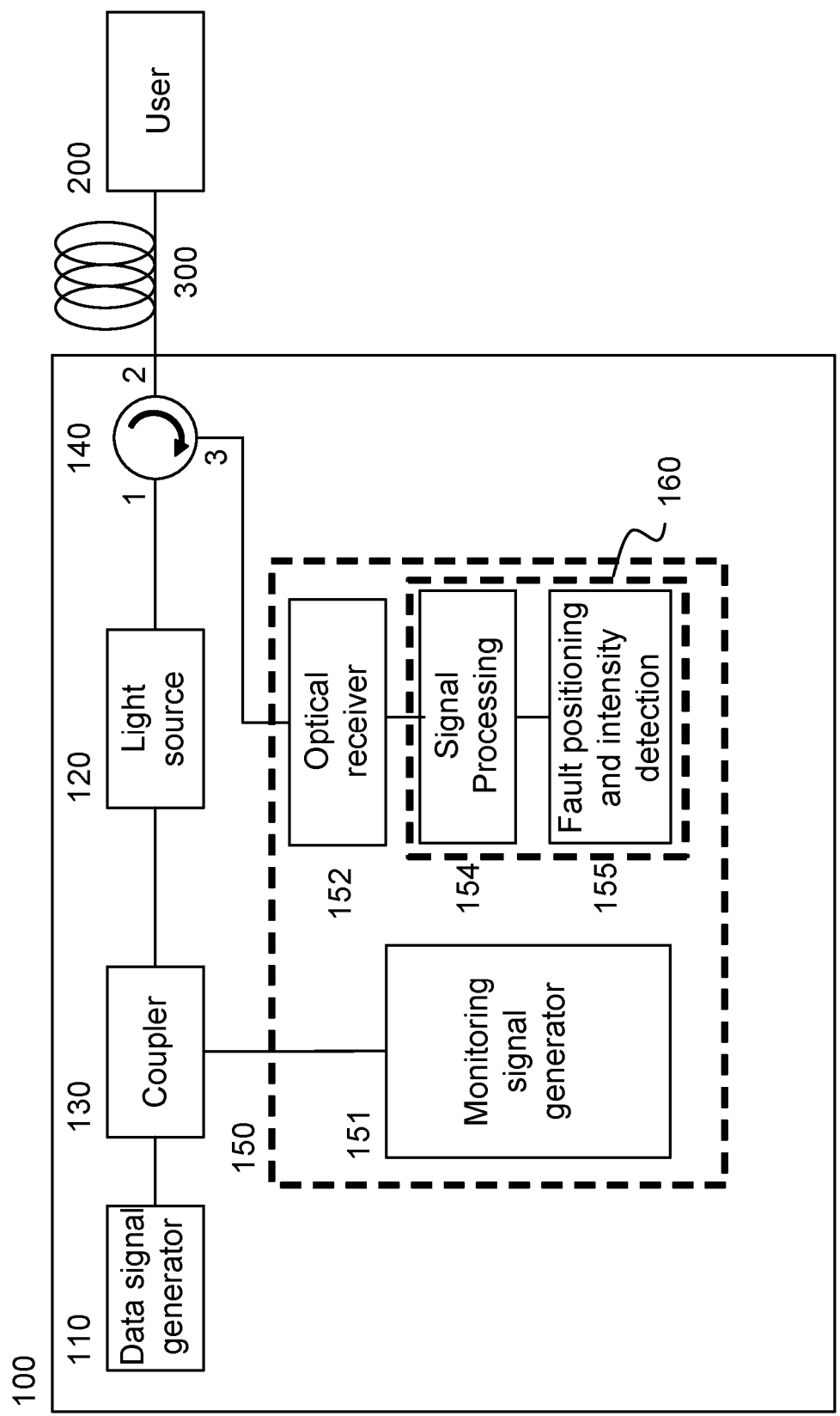
FIG. 2 illustrates the optical transmitter in which a monitoring device according to another embodiment of the present invention is implemented.
Figure 3:
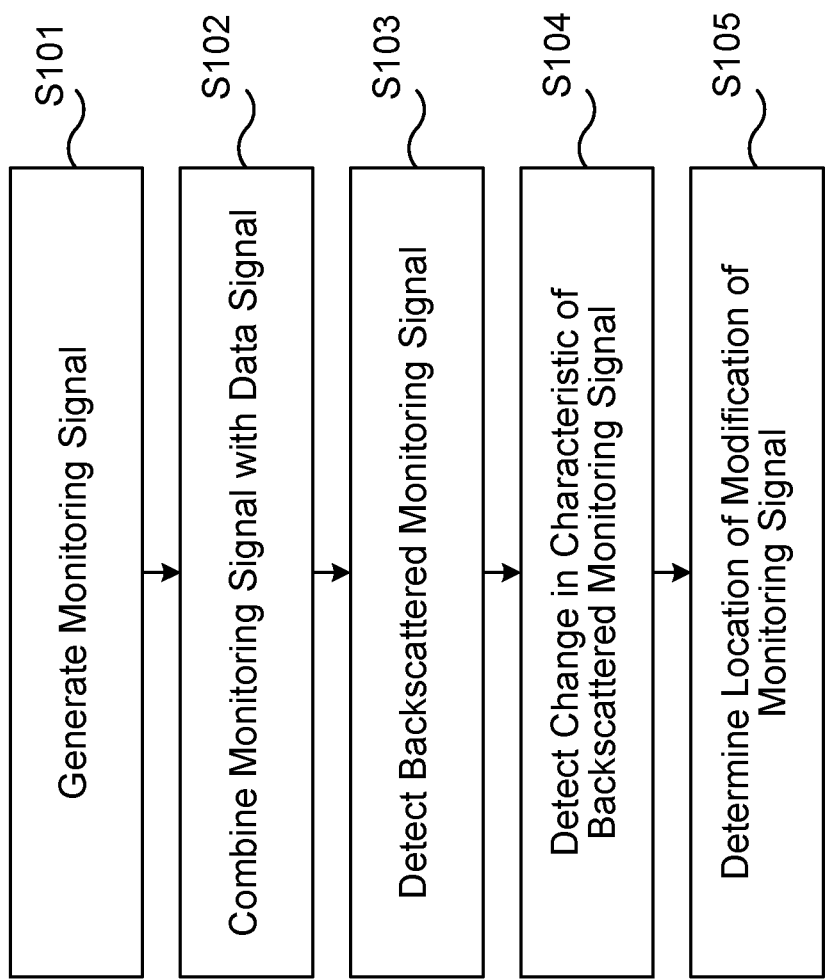
FIG. 3 illustrates a flowchart of an embodiment of a method according to the present invention as carried out by the monitoring device of FIG. 2.

FIG. 2 illustrates the optical transmitter 100 in which a monitoring device 150 according to another embodiment of the present invention is implemented. The monitoring device 150 will be described in the following with further reference to FIG. 3 illustrating flowchart of an embodiment of a corresponding method according to the present invention as carried out by the monitoring device 150 of FIG. 2.

A generator 151 of the monitoring device 150 generates in step S101 a monitoring signal, which is combined with the data signal of the data signal generator 110 in the coupler 130 in step S102. The monitoring signal is typically located in a separate subcarrier band to avoid any interference with the data signal.

The optical transmitter 100 further comprises an optical circulator 140 via which the combined signal enters port 1 and exits port 2 into the optical fibre link 300. The backscattered combined signal is guided along the link 300 towards port 2 of the circulator 140 and enters the monitoring device 150 via port 3 of the circulator 140. Thus, the monitoring device 150 according to embodiments of the present invention is advantageously implemented in an existing optical communication setup by using the coupler 130 and the circulator 140 as interface elements.

The backscattered monitoring signal entering the monitoring device 150 via port 3 of the circulator 140 is detected in step S103 by an optical receiver 152 and supplied to the microprocessor 160 functionally illustrated by a signal processing unit 154 configured to detect one or more changes in characteristic in the detected backscattered monitoring signal in step S104. In an embodiment, the detection of changes in characteristic is performed by means of signal processing, for instance by performing an FFT of the detected backscattered monitoring signal, such that a location of the fibre link 300 at which the monitoring signal backscatters due to e.g. a fault or break point can be determined as well as optical loss of the signal at the location of backscattering by block 155 of the microprocessor 160 in step S105.

Figure 4:
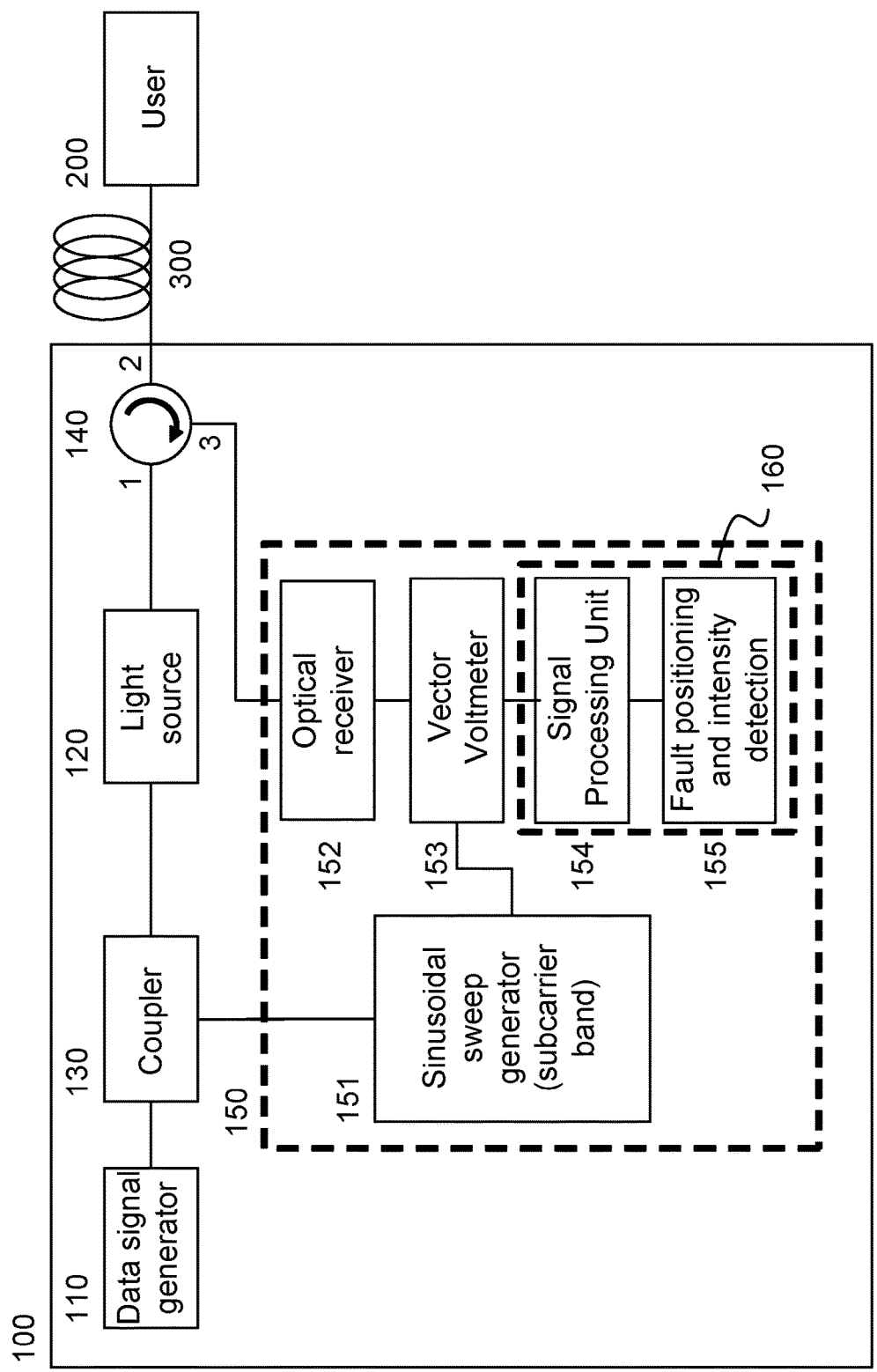
FIG. 4 illustrates a further embodiment of the monitoring device according to the present invention.

FIG. 4 illustrates a further embodiment of the monitoring device according to the present invention. The monitoring signal is generated by the sinusoidal wave generator 151 (e.g. at a particular subcarrier band) and combined with the data signal in the coupler 130. The combined signal causes the light source 120 to send optical signals via port 1 and port 2 of the circulator 140 across the optical fibre link 300 to the user 200. Any reflections or backscattering of the signal transmitted across the link 300 will be guided back and enter the circulator 140 via port 2 and exit via port 3. The backscattered signal thus enters the monitoring device 150 via port 3 of the circulator 140 and is detected by the optical receiver 152. The monitoring device 150 of this embodiment further comprises a vector voltmeter 153 using the monitoring signal generated by the generator 151 as a reference to acquire the detected backscattered signal amplitude and relative phase (from the combined signal reflected in the fibre link). The signal acquired is proportional to the output current of the optical receiver 152, which in turn is proportional to the intensity of the backscattered light. The vector voltmeter 153 is followed by a microprocessor 160 which performs a signal processing operation 154, e.g. an IFFT or FFT, of the acquired amplitude and phase of the detected backscattered monitoring signal and further determines the location of the backscattering and signal loss is determined by a best fit approach performed by the fault positioning and intensity detection block 155.

The proposed invention employs the existing transmission scheme used for data transmission in the SCM-PON, where a subcarrier band is used for monitoring of the optical fibre link 300. The power of the light source 120 of the optical transmitter 100 is sinusoidally modulated at angular frequency $\Omega$ as $P=P_0[1+m\cos(\Omega t)]$, where m is the modulation depth. The optical power backscattered along the fibre link 300 and/or reflected at discrete points, such as connectors or mendings, will then be modulated at the same frequency.

The backscattered signal from the fibre link 300 for the subcarrier embodied by the generated monitoring signal re-enters the optical transmitter 100 at port 2 of the circulator 140 followed by the optical receiver 152, for instance being a photodetector, which detects the signal intensity of the backscattered combined signal. The monitoring signal amplitude and phase of the backscattered combined signal is then detected by the vector voltmeter 153 as the frequency $\Omega$ is varied over a range of frequencies of the generated monitoring signal.

The detected backscattered signal S from the monitored fibre link 300 is given by the sum of reflections that may occur, for example at the end of the fibre link 300, and Rayleigh Backscattered Signal (RBS) along the fibre link 300.

$$S = \sum_i DP_0 R_i e^{-2\alpha z_i} e^{j2kz_i} + \int_0^L C(z')m(z')F^2(z')DP_0 e^{-2\alpha z'} e^{j2kz'} dz' \quad (1)$$

The factor D is the detectivity of the photodetector $\alpha$ is the fibre attenuation and $R_i$ is the reflectivity at the reflection point $z_i$. The factor C(z) represents the RBS coefficient of the fibre along the link and is a piecewise constant function, eventually changing its value when two different fibres are connected or spliced. The fault loss function F(z) is also a piecewise constant function describing the losses at the faults along the fibre. Its value is 1 up to the first fault, decreasing to $\delta_1$ after the first fault with loss $\delta_1$ and is sequentially multiplied by $\delta_i$ after each fault position $z_i$. The loss function is squared because the light passes twice along the lossy point in its round trip from the optical transmitter 100 to any location after the fault in the fibre link and back again. The factor $k=n\Omega/c$ is the modulation wave vector, where n is the index of refraction of the fibre. The bounded function $0<m(z)<1$ describes the random amplitude fluctuations of the Rayleigh intensity, also called Coherent Rayleigh Noise, which is dependent of the wavelength of the optical carrier.

Considering that the scattering coefficient is nonzero only within the fibre length $0<z<L$ and that a single type of fibre is used in the link, the limits of integration in integral term in Equation (1) can be extended to $\pm\infty$ and C(z) can be assumed constant. Taking the Inverse Fourier Transform of the recorded data will result in:

$$\tilde{S}(z) = \sum_i DP_0 R_i e^{-2\alpha z_i} \frac{1}{\sqrt{2\pi}} \int_{-\infty}^{+\infty} e^{2jkz_i} e^{-jkz} ++ \qquad (2)$$

$$\frac{1}{\sqrt{2\pi}} \int_{-\infty}^{+\infty} \left[ \int_{-\infty}^{+\infty} Cm(z') F^2(z') DP_0 e^{-2\alpha z'} e^{j2kz'} dz' \right] e^{-jkz} dk$$

Changing the order of integration and integrating in k Eq. (2) becomes:

$$\tilde{S}(z) = \sum_i DP_0 R_i e^{-2\alpha z_i} \delta(2z_i - z) + \qquad (3)$$

$$\int_{-\infty}^{+\infty} Cm(z') F^2(z') DP_0 e^{-2\alpha z'} \delta(2z' - z) dz'$$

which represents a sum of peaks corresponding to localized reflections plus a continuous function corresponding to the Rayleigh scattering. In practice, the measurements on the received signal are performed on a limited set of frequencies within the subcarrier band allocated for data transmission, defining a limited set of corresponding wavenumbers, which will act as a window for the Inverse Fast Fourier Transform (IFFT) processing. The Dirac delta functions in eq. (3) will then be transformed into the IFFT of the window function used. Equation (3) can then be rewritten as:

$$\tilde{S}(z) = \sum_i DP_0 R_i e^{-2\alpha z_i} W(z - 2z_i) + \frac{1}{2} Cm\left(\frac{z}{2}\right) F^2\left(\frac{z}{2}\right) DP_0 e^{-\alpha z} \qquad (4)$$

The localized reflections along the fibre are directly obtained from the peaks in the IFFT function, the corresponding intensities being given by:

$$R_i = \frac{\tilde{S}(2z_i)}{DP_0} e^{2\alpha z_i} \qquad (5)$$

Taking the square root of Eq. (4) and using the normal OTDR twofold scale factor for the z-axis, the loss function F(z) can be calculated in dB by:

$$m(z)|_{dB} + F(z)|_{dB} - \alpha z|_{dB} = A + 5 \text{Log}\left[ \tilde{S}(z) - \sum_i DP_0 R_i e^{-\alpha z_i} W(z - z_i) \right] \qquad (6)$$

where the reflection peaks were subtracted from the IFFT curve and A is a constant accounting for the detectivity of the photodetector, Rayleigh scattering coefficient, scale factors etc.

The Coherent Rayleigh Noise (CRN) function m(z) appears as a random noise, which is added to the desired signal and depends on the wavelength of the optical carrier, as well as on the radio frequency (RF) window used for the measurements. Hence, if measurements of the received signal are performed at different optical wavelengths or different sets of RF modulation frequencies all terms in Eq. (6) will remain unchanged except for m(z). Since this function is randomly varying between 0 and 1, the average of a great number of different measurements will converge to the constant ½ (−3 dB in Log scale), which means that the coherent Rayleigh noise can be averaged out by averaging the IFFT of different measurements performed at different wavelengths or RF ranges.

It should be noted that when different fibres are spliced together the fibre loss $\alpha$ and the Rayleigh coefficient would be constant along each fibre, stepwise varying at the splice. Hence, even in the more general case of an arbitrary number of fibres spliced along the link Equation (6) advantageously describes the measured data the function, F(z) and $\alpha(z)$ now describing the losses along the link and the fibre differences along the same link.

Figure 5:
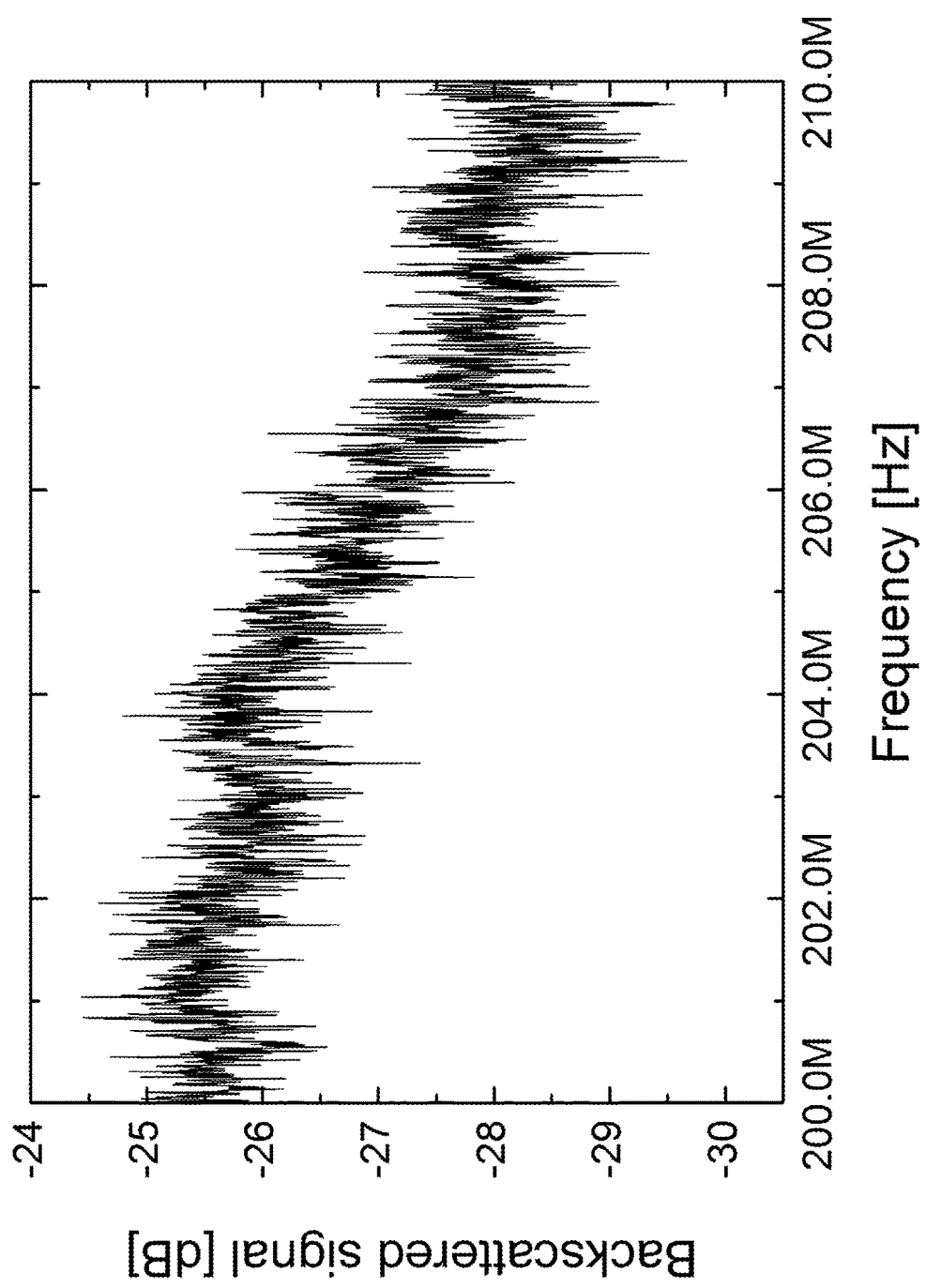
FIG. 5 illustrates the measured backscattered signal as function of the frequency.

FIG. 5 illustrates the measured amplitude of the back-scattered signal for a 12 km optical fibre link with a 2.0 dB loss event near 8 km. A single set of modulation frequencies was used in the 200-210 MHz range. The measurement at each frequency was undertaken for a time period long enough to allow for the full round trip transit of the modulation signal along the whole fibre, different from an incoherent OFDR technique.

Figure 6:
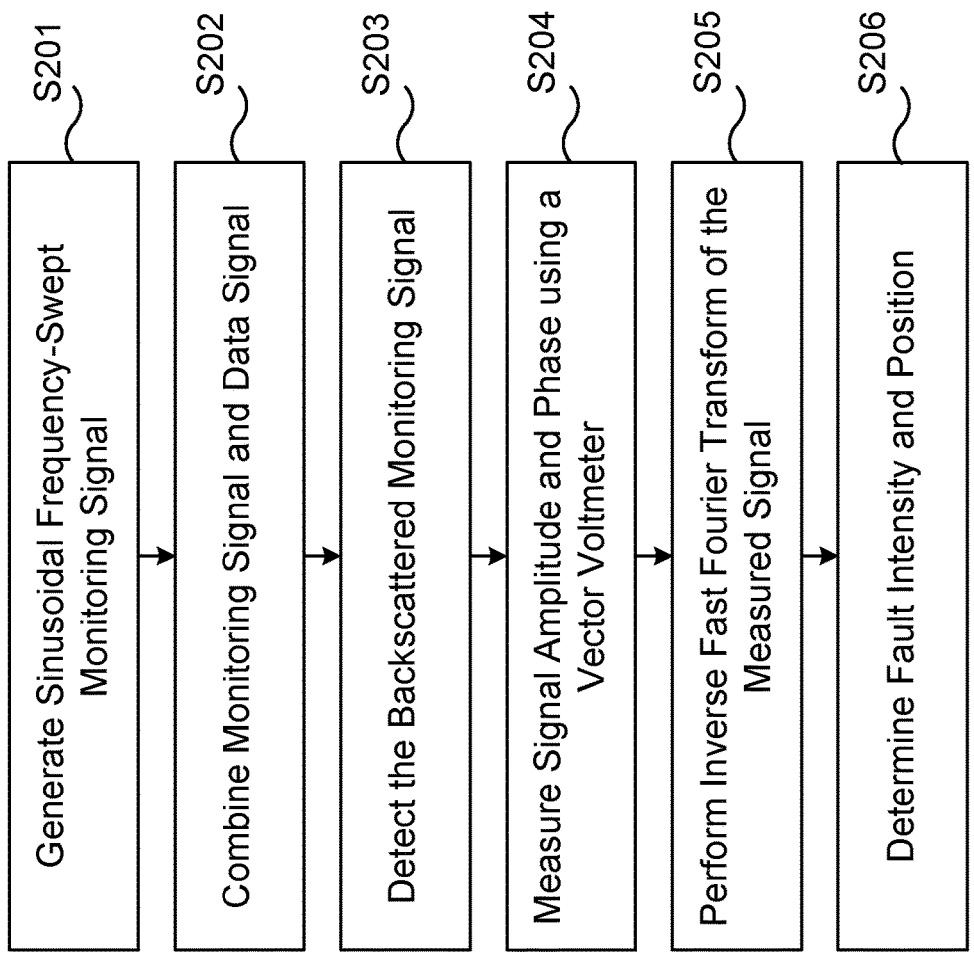
FIG. 6 illustrates a flowchart of a method of monitoring an optical fibre link according to a further embodiment of the present invention using IFFT.

FIG. 6 illustrates a flowchart of a method of monitoring an optical fibre link according to a further embodiment of the present invention. Reference is further made to FIG. 4 for structural elements. The generator 151 of the monitoring device 150 performs a sinusoidal frequency sweep (e.g. at one of the subcarrier bands) to generate the monitoring signal in step S201. The generated monitoring signal is combined with the data signal in the coupler 130 in step S202. The combined signal causes the light source 120 to send optical signals via port 1 and port 2 of the circulator 140 across the optical fibre link 300 to the user 200. Any reflections of the signal transmitted across the fibre link 300 will backscatter and enter the circulator 140 via port 2 and exit via port 3. The backscattered signal thus enters the monitoring device 150 via port 3 of the circulator 140 and is detected by the optical receiver 152 in step S203. The monitoring device 150 of this embodiment further comprises a vector voltmeter 153 using the frequency-swept monitoring signal generated by the generator 151 as a reference to acquire the detected backscattered signal amplitude and relative phase (from the combined signal reflected in the fibre link) in step S204. The signal acquired is proportional to the output current of the optical receiver 152, which in turn is proportional to the intensity of the backscattered light. The vector voltmeter 153 is followed by a microprocessor 160 that fits, in step S205 by block 154, the acquired phase and amplitude of the measured backscattered monitoring signal as illustrated in FIG. 5 and performs an IFFT of the acquired data. In step 206, the discrete reflection peaks are subtracted from the IFFT trace and the resulting curve is fit by a piecewise linear curve (in logarithmic scale) with steps at the corresponding fault positions and step values corresponding to the losses at these positions as described in Eq. (6).

Figure 7:
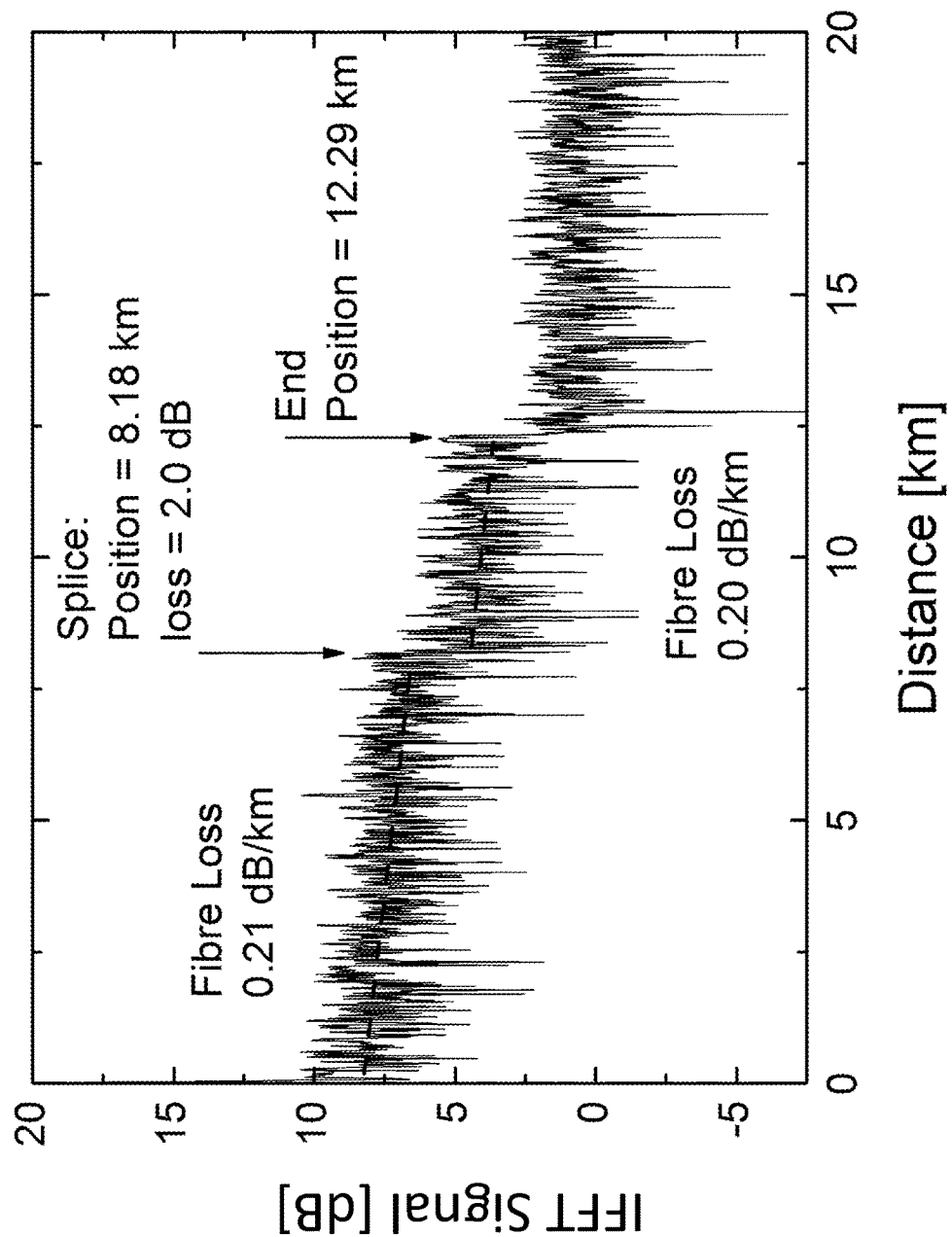
FIG. 7 illustrates an IFFT treated signal with loss positioning.

FIG. 7 illustrate the result of the IFFT signal processing of the measured signal in FIG. 5, which hereinafter will be referred to as Spatial Domain Trace. The fibre losses are obtained in step 206 by piecewise linear fitting the exponential decay of the signal intensity in logarithmic scale, whereas the loss at the fault position is directly obtained by extrapolating the linear fits at the transition points.

Advantageously, the fitting of the Spatial Domain Trace is performed using an LMS algorithm and Trend Filter, decomposing the signal into a piecewise linear curve with sparse level shifts. Thus, block 154 uses the IFFT signal processing to obtain the Spatial Domain Trace whereas block 155 employs LMS and Trend Filter algorithms to fit the Spatial Domain Trace by a piecewise linear curve thus obtaining the fault positions and losses in step S206. It should be noted that the use of the LMS algorithm is an example embodiment and any appropriate fitting algorithm using any appropriate fitting criterion can be envisaged, such as for instance an absolute value mean deviation, fourth power mean deviation or any weighted mean deviation method, etc. Furthermore, any digital filtering technique such as Least Absolute Shrinkage and Selection Operator (LASSO), Atheoretical Regression Trees (ART) or Potts functionals, adaptive or not, can be used to appropriately process the signal to obtain the level shifts and positions.

Steps 201 to 205 can be repeated any desired number of times and the results averaged to increase the signal to noise ratio before processed in step 206.

Advantageously, the set of frequencies used to obtain the monitoring signal can be varied in step S201 to obtain independent Spatial Domain Traces that can be used to average out the CRN noise. Different optical wavelength measurements when available can also be advantageously used to further average the CRN noise, thus increasing sensibility and accuracy in the detection of small faults.

Figure 8:
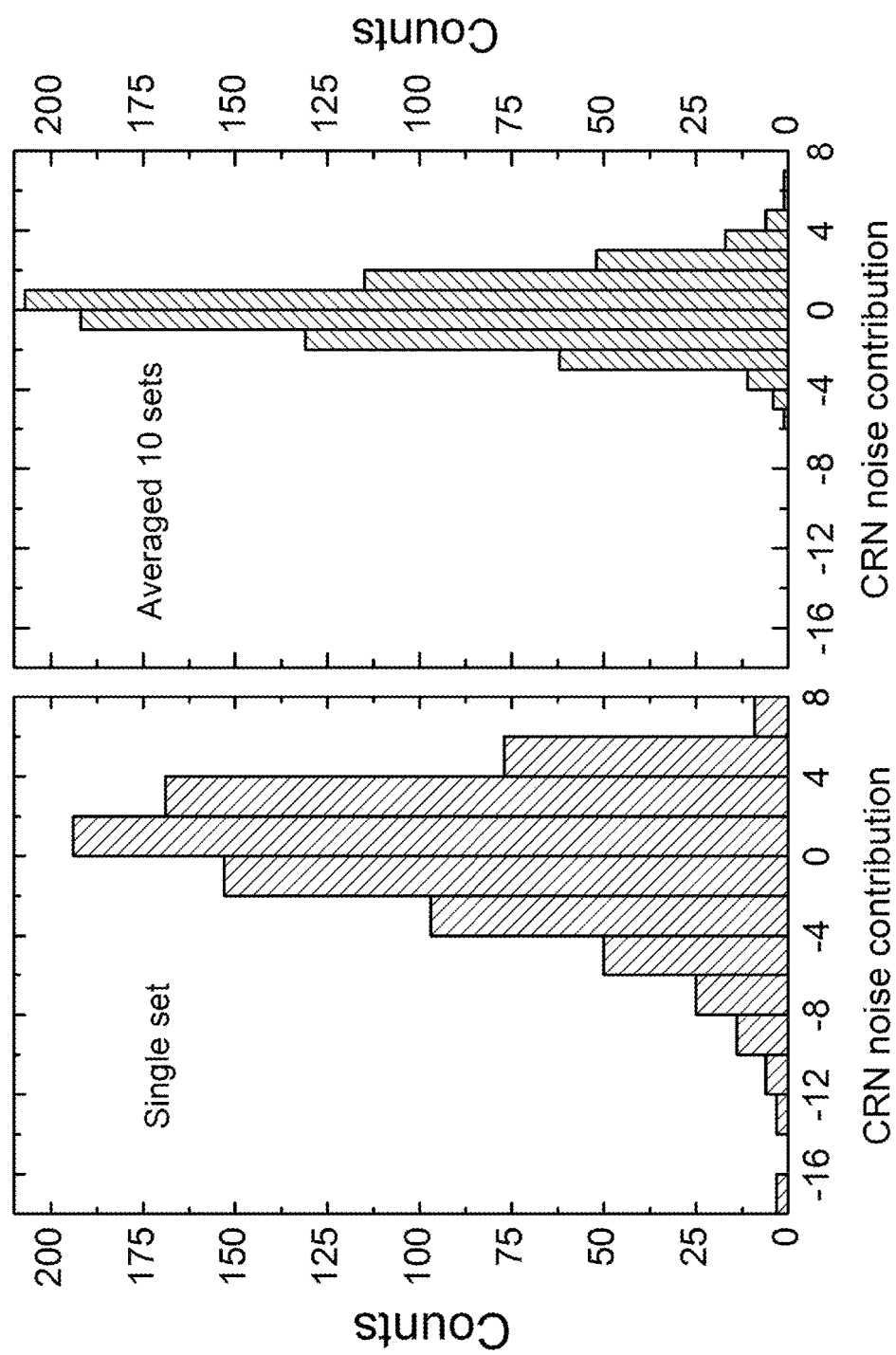
FIG. 8 illustrates the distribution of the Coherent Rayleigh Noise and the effect of averaging data from different sets of frequencies.

FIG. 8 illustrates the averaging of the CRN by obtaining the Spatial Domain Trace for an ensemble of 10 different sets of frequencies, within the 200-220 MHz subcarrier bandwidth, compared to the CRN for a single frequency sweep. The distribution function is sharpened by a threefold factor, which approximately corresponds to the expected $10^{1/2}$ factor due to the averaging random numbers.

Figure 9:
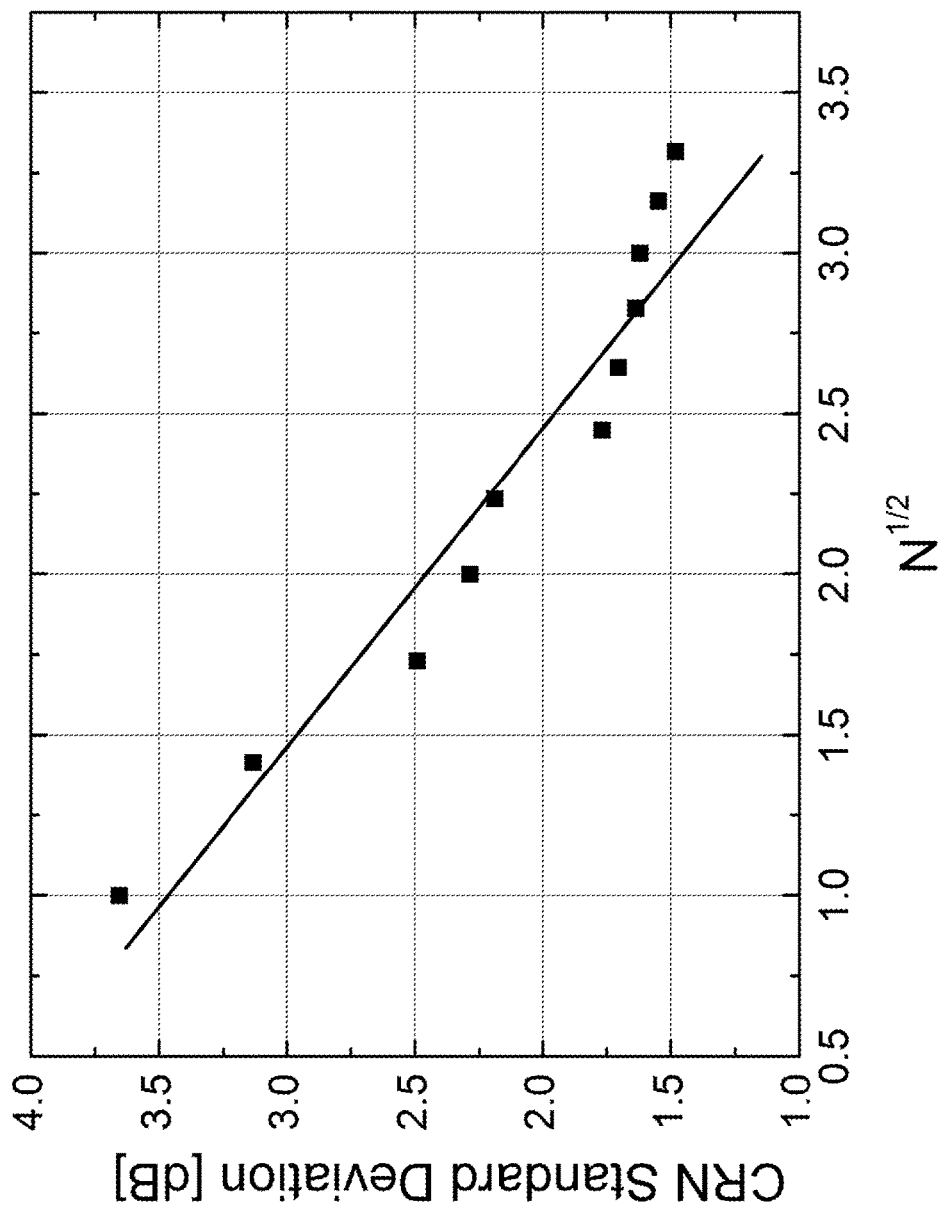
FIG. 9 illustrates the variation of the Coherent Rayleigh Noise with the number of frequency sets used in averaging.

FIG. 9 illustrates the variance of the CRN as the number of frequency sets used for averaging the Spatial Domain Trace is increased. As a reference, the straight line corresponding to a $N^{-1/2}$ dependence is shown.

It should further be noted that when sweeping the frequency of the monitoring signal and measuring the backscattered signal amplitude and phase, it is in fact the backscattering transfer function that is measured. Hence, any appropriate method of performing this measurement is applicable. As an example, a network analyser or any electronic circuit capable of measuring the relative amplitude and phase of two electric signals could be used to determine the phase and amplitude of the detected backscattered monitoring signal. As a further example, the backscattered transfer function could be measured by launching an impulse monitoring signal (containing all desired frequencies) and measure the response. The amplitude/phase at each frequency would analogously be obtained by mathematical processing of the received signal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of monitoring an optical fibre link, comprising:
   generating a monitoring signal used for monitoring the optical fibre link, the monitoring signal being sinusoidally frequency-swept over at least one set of selected frequencies;
   combining the monitoring signal with a data signal to be transmitted over the optical fibre link, the combined signal including the monitoring signal in a separate subcarrier band than the data signal;
   detecting, at an optical receiver, backscattering of the monitoring signal from the combined signal that is transmitted over the optical fibre link;
   performing vector voltmeter detection of the backscattering, using the monitoring signal as a reference, wherein a measured amplitude and phase of the backscattering are detected;
   detecting a change in characteristic of the measured amplitude and phase, the detecting of the change in characteristic including determining an Inverse Fast Fourier Transform (IFFT) corresponding to the backscattering;
   generating a piecewise linear curve corresponding to the IFFT; and
   determining, based on the piecewise linear curve, at least one location along the optical fibre link where the monitoring signal is modified, and signal loss at the at least one location.

2. The method of claim 1, further comprising:
   generating the monitoring signal by performing a sweep over a plurality of sets of selected frequencies;
   calculating Inverse Fast Fourier Transforms of the backscattering for each set of frequencies; and
   averaging results of the Inverse Fast Fourier Transforms calculated for each set of frequencies.

3. The method of claim 2, wherein the determining of said at least one location comprises:
   determining, based on the averaged results of the Inverse Fast Fourier Transforms of the backscattering, said at least one location along the optical fibre link where the monitoring signal is modified, wherein a location of at least one fault of the optical fibre link and the signal loss caused by the at least one fault are detected.

4. The method of claim 1, wherein the determining of the at least one location along the fibre where the monitoring signal is modified comprises:
   comparing the change in characteristic of the backscattering with an estimated change in characteristic of the backscattering; and
   determining said at least one location and the signal loss from a best fit of the change in characteristic of the backscattering to the estimated change in characteristic of the backscattering.

5. The method of claim 1, wherein the at least one location along the optical fibre link where the monitoring signal is modified, and the signal loss caused by the modification, are determined using Least Mean Square fitting.

6. The method of claim 1, further comprising:
   generating the data signal to be transmitted over the optical fibre link;
   generating an optical signal over the optical fibre link based on the combined signal;

supplying the generated optical signal to a first port of a circulator for transmission of the generated optical signal over the optical fibre link via a second port of the circulator;

receiving the backscattering via the second port of the circulator; and supplying the backscattering to a monitoring device via a third port of the circulator.

7. The method of claim 1,
wherein the piecewise linear curve includes sparse level shifts.

8. A monitoring device configured to monitor an optical fibre link, comprising:

a signal generator configured to generate a monitoring signal to be combined with a data signal to be transmitted by an optical transmitter over the optical fibre link the monitoring signal being sinusoidally frequency-swept over at least one set of selected frequencies, the combined signal including the monitoring signal in a separate subcarrier band than the data signal;

an optical receiver configured to detect backscattering of the monitoring signal from the optical fibre link;

a vector voltmeter configured to perform amplification of the backscattering, using the monitoring signal as a reference, using the monitoring signal as a reference, wherein a measured amplitude and phase of the backscattering are detected; and a processing unit configured to:

detect a change in characteristic of a measured phase and amplitude of the backscattering by calculating an Inverse Fast Fourier Transform (IFFT) of the detected backscattered monitoring signal, the detecting of the change in characteristic including determining an Inverse Fast Fourier Transform (IFFT) corresponding to the backscattering;

generate a piecewise linear curve corresponding to the IFFT; and determine, based on the piecewise linear curve, at least one location along the optical fibre link where the monitoring signal is modified, and a signal loss caused by the modification.

9. The monitoring device of claim 8, the signal generator further being configured to:

generate the monitoring signal by performing a sweep over a plurality of sets of selected frequencies; and the processing unit further being configured to:

calculate Inverse Fast Fourier Transforms of the backscattering for each set of frequencies; and average results of the Inverse Fast Fourier Transforms calculated for each set of frequencies.

10. The monitoring device of claim 9, the processing unit further being configured to, when determining said at least one location:

determine, based on the averaged results of the Inverse Fast Fourier Transforms of the backscattering, said at least one location along the optical fibre link where the backscattering is modified, wherein a location of at least one fault of the optical fibre link and the signal loss caused by the at least one fault are detected.

11. The monitoring device of claim 8, the processing unit being configured to, when determining the at least one location along the fibre where the monitoring signal is modified:

compare the change in characteristic of the backscattering with an estimated change in characteristic of the backscattering; and determine said at least one location from a best fit of the change in characteristic of the backscattering to the estimated change in characteristic of the backscattering.

12. The monitoring device of claim 8, the processing unit being configured to, when determining the at least one location:

determine, based on averaged results of Inverse Fast Fourier Transforms of the backscattering, said at least one location along the optical fibre link where the monitoring signal is modified, wherein a location of at least one fault of the optical fibre link and a signal loss caused by the at least one fault are detected.

13. The monitoring device of claim 8, the processing unit being configured to determine the at least one location along the optical fibre link where the monitoring signal is modified, and the signal loss caused by the modification, using Least Mean Square fitting.

14. The monitoring device of claim 8, the optical transmitter further comprising:

a data signal generator configured to generate the data signal to be transmitted over the optical fibre link;

a coupler configured to combine the data signal with the monitoring signal to generate the combined signal;

a light source configured to generate an optical signal over the optical fibre link based on the combined signal; and a circulator configured to receive the generated optical signal at a first port and to transmit the generated optical signal over the optical fibre link via a second port, the circulator further being configured to receive the backscattering via the second port and supply the backscattering to the monitoring device via a third port.

15. The monitoring device of claim 8,
wherein the piecewise linear curve includes sparse level shifts.

16. A non-transitory computer readable medium comprising computer-executable instructions, which when executed on a processing unit, cause the processing unit to perform operations comprising:

generating a monitoring signal used for monitoring an optical fibre link, the monitoring signal being sinusoidally frequency-swept over at least one set of selected frequencies;

combining the monitoring signal with a data signal to be transmitted over the optical fibre link, the combined signal including the monitoring signal in a separate subcarrier band than the data signal;

detecting, at an optical receiver, backscattering of the monitoring signal from the combined signal that is transmitted over the optical fibre link;

performing vector voltmeter detection of the backscattering, using the monitoring signal as a reference, wherein a measured amplitude and phase of the backscattering are detected;

detecting a change in characteristic of the measured amplitude and phase, the detecting of the change in characteristic including determining an Inverse Fast Fourier Transform (IFFT) corresponding to the backscattering;

generating a piecewise linear curve corresponding to the IFFT; and determining, based on the piecewise linear curve, at least one location along the optical fibre link where the monitoring signal is modified, and signal loss at the at least one location.

17. The non-transitory computer readable medium of claim 16, wherein the at least one location along the optical fibre link where the monitoring signal is modified, and the signal loss caused by the modification, are determined using Least Mean Square fitting.

18. The non-transitory computer readable medium of claim 16,
   wherein the piecewise linear curve includes sparse level shifts.

* * * * *